United States Patent
Chen et al.

(10) Patent No.: US 9,152,336 B1
(45) Date of Patent: Oct. 6, 2015

(54) SYSTEM AND METHOD FOR LUN ADJUSTMENT

(75) Inventors: Xiangping Chen, Shrewsbury, MA (US); Miles A. de Forest, Bahama, NC (US); Thomas E. Linnell, Northborough, MA (US); Dennis Thomas Duprey, Raleigh, NC (US); Khang Can, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 170 days.

(21) Appl. No.: 13/539,433

(22) Filed: Jun. 30, 2012

(51) Int. Cl.
G06F 3/06 (2006.01)
G06F 12/02 (2006.01)

(52) U.S. Cl.
CPC ............ G06F 3/0644 (2013.01); G06F 3/0665 (2013.01); *G06F 3/0613* (2013.01); *G06F 3/0614* (2013.01)

(58) Field of Classification Search
CPC ..... G06F 12/00; G06F 3/0662; G06F 3/0665; G06F 3/067; G06F 3/0689; G06F 3/0644; G06F 3/0613; G06F 3/0614
See application file for complete search history.

(56) References Cited

U.S. PATENT DOCUMENTS

| | | | | |
|---|---|---|---|---|
| 6,934,804 | B2 * | 8/2005 | Hashemi | 711/114 |
| 7,631,155 | B1 * | 12/2009 | Bono et al. | 711/156 |
| 7,882,386 | B1 * | 2/2011 | Potnis et al. | 714/2 |
| 2005/0172097 | A1 * | 8/2005 | Voigt et al. | 711/170 |
| 2008/0229048 | A1 * | 9/2008 | Murase et al. | 711/171 |
| 2010/0235602 | A1 * | 9/2010 | Chan | 711/170 |
| 2010/0332646 | A1 * | 12/2010 | Balasubramanian et al. | 709/224 |
| 2010/0332745 | A1 * | 12/2010 | Kano et al. | 711/112 |

\* cited by examiner

*Primary Examiner* — Cheng-Yuan Tseng
*Assistant Examiner* — Francisco Grullon
(74) *Attorney, Agent, or Firm* — Brian J. Colandreo; Mark H. Whittenberger; Holland & Knight LLP

(57) ABSTRACT

A method, computer program product, and computing system for comparing at least one performance benchmark to at least one performance indicator for a front end LUN. If the at least one performance indicator exceeds the at least one performance benchmark, the failure domain of the front end LUN is reduced. If the at least one performance indicator does not exceed the performance benchmark, the failure domain of the front end LUN is increased.

15 Claims, 4 Drawing Sheets

SYSTEM AND METHOD FOR LUN ADJUSTMENT

TECHNICAL FIELD

This disclosure relates to front end LUNs and, more particularly, to the performance adjustment of front end LUNs.

BACKGROUND

Storing and safeguarding electronic content is of paramount importance in modern business. Accordingly, various systems may be employed to protect such electronic content. To provide better performance, front end LUNs may utilize storage from multiple backend devices (e.g., wide-striping). Unfortunately, this practice also increases the LUNs failure probability, since failure of any contributing backend device may lead to front end LUN failure.

The use of solid-state storage devices is increasing in popularity for all forms of data storage and may be used for the above-referenced backend devices. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF DISCLOSURE

In a first implementation, a computer-implemented method includes comparing at least one performance benchmark to at least one performance indicator for a front end LUN. If the at least one performance indicator exceeds the at least one performance benchmark, the failure domain of the front end LUN is reduced. If the at least one performance indicator does not exceed the performance benchmark, the failure domain of the front end LUN is increased.

One or more of the following features may be included. Reducing the failure domain may decrease the performance of the front end LUN by decreasing the quantity of backend devices contributing slices to the front end LUN. Increasing the failure domain may increase the performance of the front end LUN by increasing the quantity of backend devices contributing slices to the front end LUN. The performance benchmark may be a range. The front end LUN may be constructed from a plurality of backend LUN slices. The backend LUN slices may be slices of one or more backend LUNs. The performance benchmark may be chosen from the group consisting of: IOs per second, response time, latency, utilization, and throughput.

In another implementation, a computer program product resides on a computer readable medium that has a plurality of instructions stored on it. When executed by a processor, the instructions cause the processor to perform operations including comparing at least one performance benchmark to at least one performance indicator for a front end LUN. If the at least one performance indicator exceeds the at least one performance benchmark, the failure domain of the front end LUN is reduced. If the at least one performance indicator does not exceed the performance benchmark, the failure domain of the front end LUN is increased.

One or more of the following features may be included. Reducing the failure domain may decrease the performance of the front end LUN by decreasing the quantity of backend devices contributing slices to the front end LUN. Increasing the failure domain may increase the performance of the front end LUN by increasing the quantity of backend devices contributing slices to the front end LUN. The performance benchmark may be a range. The front end LUN may be constructed from a plurality of backend LUN slices. The backend LUN slices may be slices of one or more backend LUNs. The performance benchmark may be chosen from the group consisting of: IOs per second, response time, latency, utilization, and throughput.

In another implementation, a computing system includes at least one processor and at least one memory architecture coupled with the at least one processor, wherein the computing system is configured to perform operations including comparing at least one performance benchmark to at least one performance indicator for a front end LUN. If the at least one performance indicator exceeds the at least one performance benchmark, the failure domain of the front end LUN is reduced. If the at least one performance indicator does not exceed the performance benchmark, the failure domain of the front end LUN is increased.

One or more of the following features may be included. Reducing the failure domain may decrease the performance of the front end LUN by decreasing the quantity of backend devices contributing slices to the front end LUN. Increasing the failure domain may increase the performance of the front end LUN by increasing the quantity of backend devices contributing slices to the front end LUN. The performance benchmark may be a range. The front end LUN may be constructed from a plurality of backend LUN slices. The backend LUN slices may be slices of one or more backend LUNs. The performance benchmark may be chosen from the group consisting of: IOs per second, response time, latency, utilization, and throughput.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
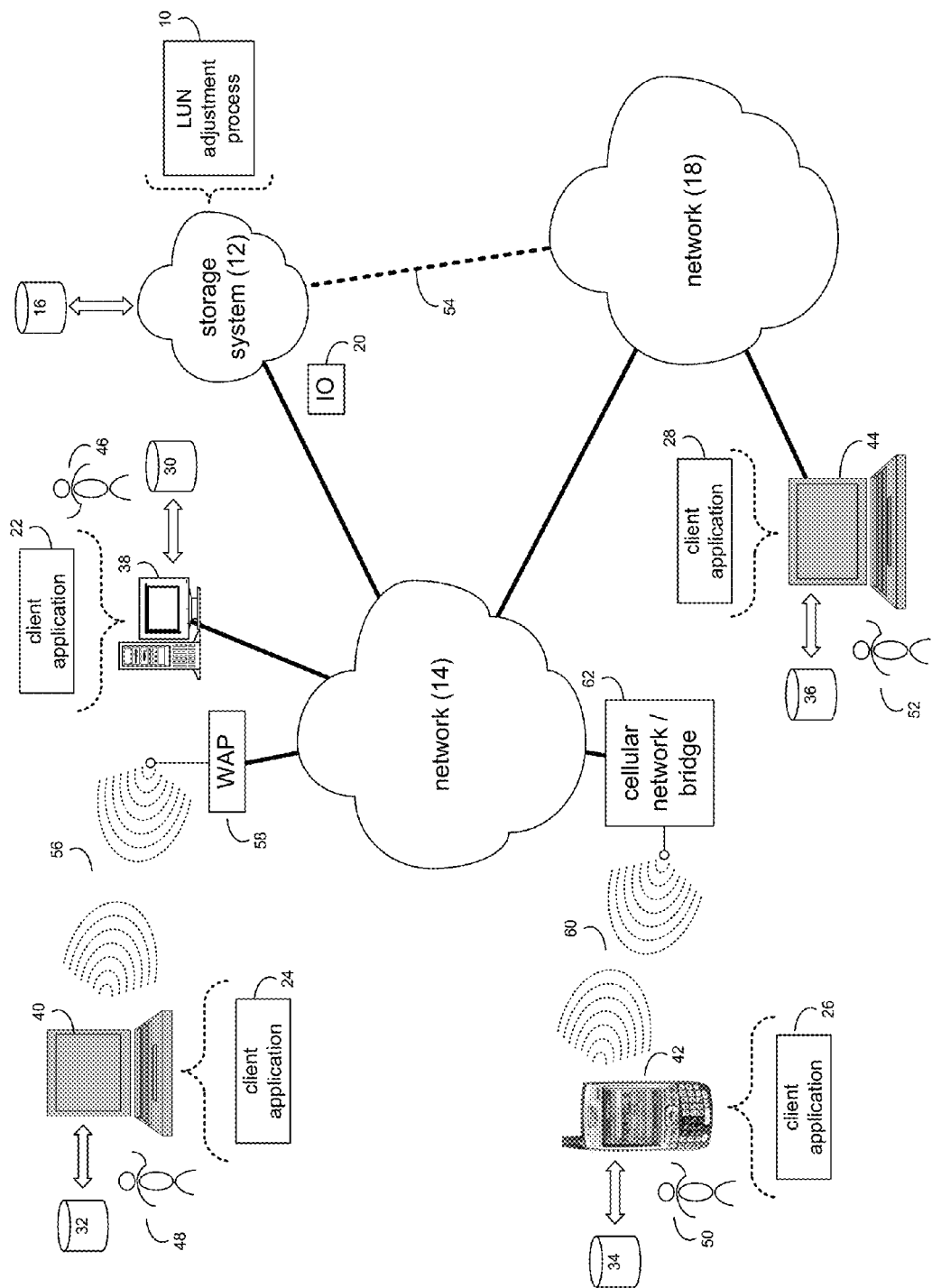
FIG. 1 is a diagrammatic view of a storage system and a LUN adjustment process coupled to a distributed computing network.

System Overview:

Referring to FIG. 1, there is shown LUN adjustment process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™ Unix, or a custom operating system, for example.

The instruction sets and subroutines of LUN adjustment process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
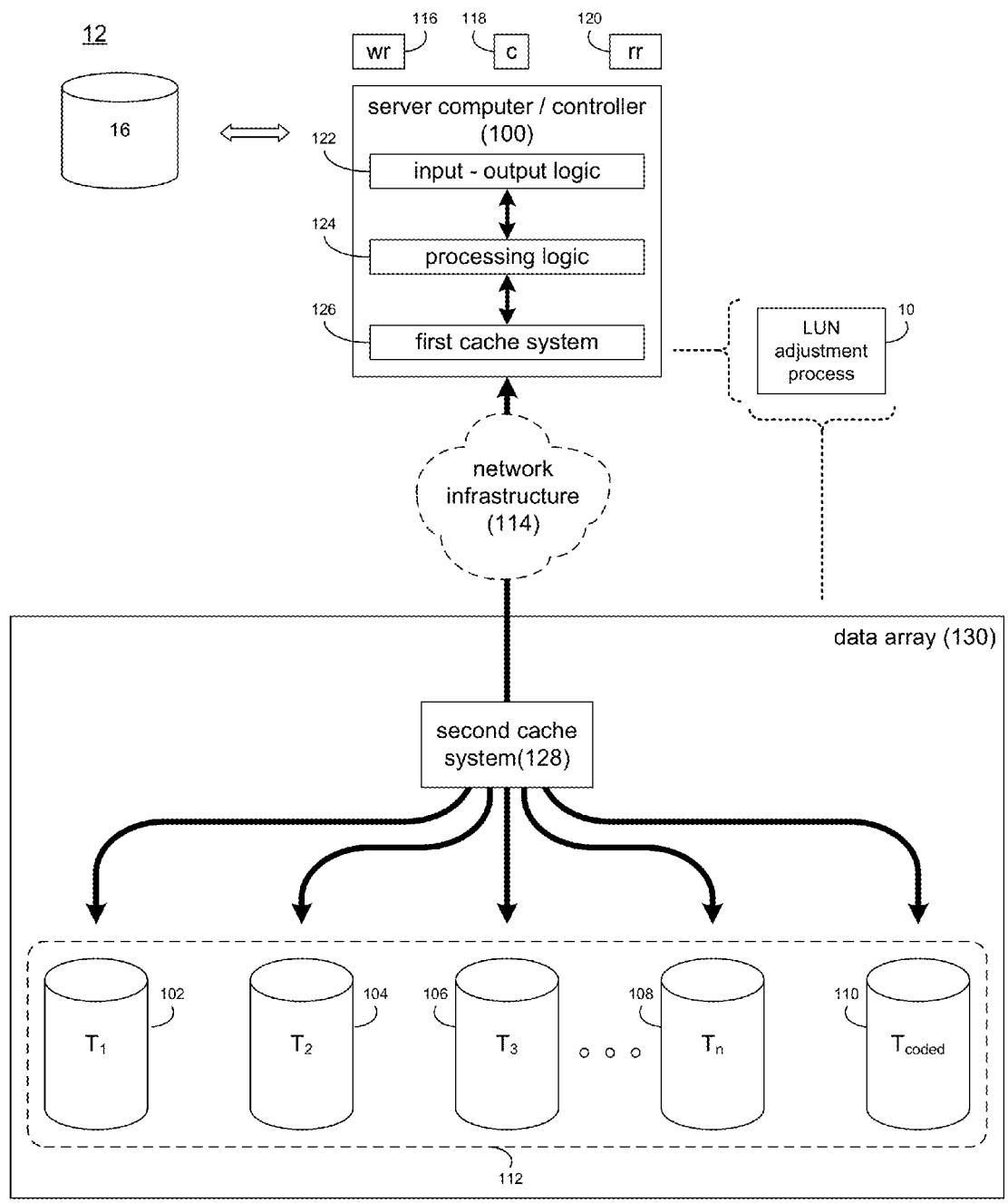
FIG. 2 is a diagrammatic view of the storage system of FIG. 1.

Referring also to FIG. 2, storage system 12 may include a server computer/controller (e.g. server computer/controller 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of LUN adjustment process 10. The instruction sets and subroutines of LUN adjustment process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or a NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced. As will be described below in greater detail, first cache system 126 may be a content-aware cache system.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of TO requests (e.g., TO request 20), the overall performance of storage system 12 may be enhanced. As will be described below in greater detail, second cache system 128 may be a content-aware cache system.

As discussed above, the instruction sets and subroutines of LUN adjustment process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of LUN adjustment process 10 may be executed by one or more processors (not shown) and one or more memory architectures (not shown) included within data array 130.

Figure 3:
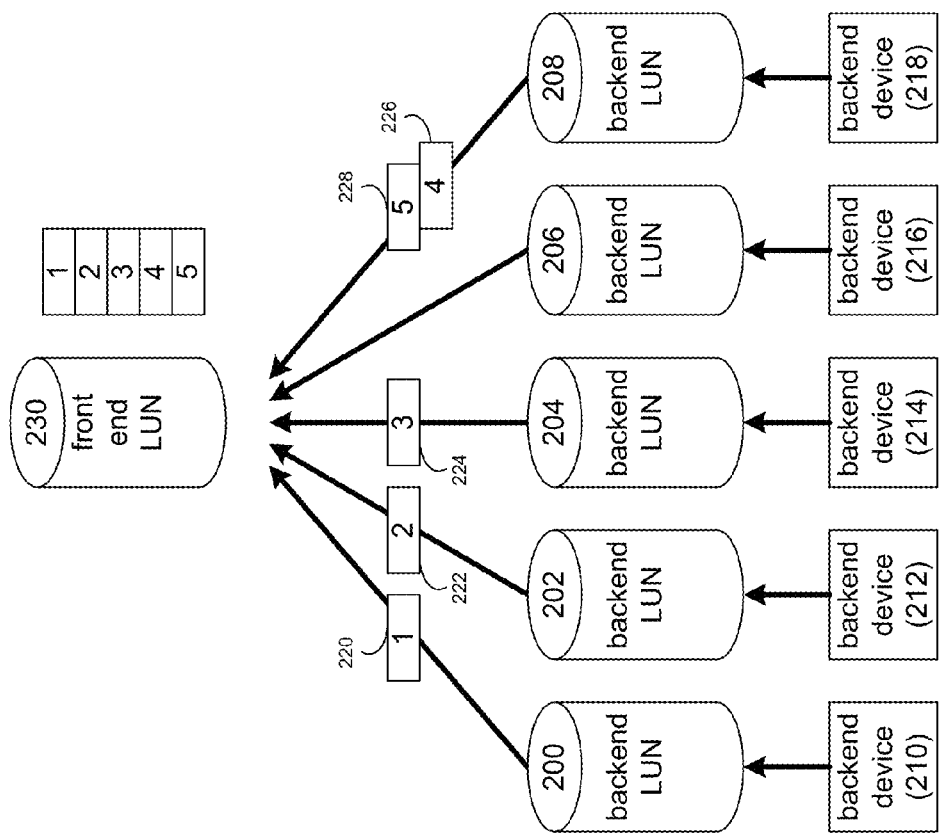
FIG. 3 is another diagrammatic view of the storage system of FIG. 1.

LUN Adjustment Process:

Referring also to FIG. 3, there are shown various LUNs (i.e., Logical Unit Numbers). As is known in the art, a LUN is a logical storage device that may be "constructed" from various physical portions of physical storage devices (such as those included within storage targets 102, 104, 106, 108).

For example, one of more of the backend devices included within data array 130 may be used to generate backend LUNs 200, 202, 204, 206, 208 wherein: a first backend device 210 is used to generate LUN 200; a second backend device 212 is used to generate LUN 202; a third backend device 214 is used to generate LUN 204; a fourth backend device 216 is used to generate LUN 206; and a fifth backend device 218 is used to generate LUN 208. As discussed above, backend devices 210, 212, 214, 216, 218 may be storage targets (e.g., storage targets 102, 104, 106, 108). Typically, a backend LUN is generated from a single backend device (e.g., a single disk drive or a single RAID device).

Typically, each of the backend LUNs (i.e., backend LUNs 200, 202, 204, 206, 208) is divided into a plurality of slices (portions). A typical value of such a portion may be one gigabyte. Accordingly, if backend LUN 200 is 10.0 gigabytes in size, backend LUN 200 may be divided into ten slices. Slices from the various backend LUNs (e.g., backend LUNs 200, 202, 204, 206, 208), such as slices 220, 222, 224, 226, 228, may be used to form front end LUN 230, wherein front end LUN 230 is (in this example) a 5.0 gigabyte LUN.

As would be expected, the greater the quantity of physical devices that contribute slices to front end LUN 230, the better the performance of front end LUN 230, as more separate and discrete devices (e.g., physical disk drives or RAID devices) are handling the storage tasks associated with front end LUN 230. However, as the quantity of physical devices that contribute slices to front end LUN 230 increases, so does the "failure domain" (also referred to as splatter) of front end LUN 230, as more devices contributing equals more devices to fail. Accordingly, the likelihood of one of ten devices failing is greater than the likelihood of one of five devices failing.

Accordingly, LUN adjustment process 10 may be configured so that the quantity of devices contributing slices to e.g., front end LUN 230 is maintained as small as possible (to reduce the failure domain), while maintaining the quantity of devices contributing slices to front end LUN 230 as large as needed to provide the required level of performance.

Figure 4:
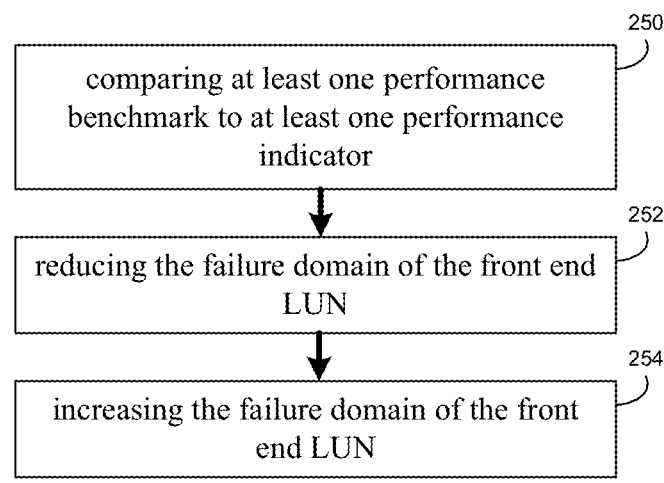
FIG. 4 is a flow chart of the LUN adjustment process of FIG. 1.

Therefore and referring also to FIG. 4, LUN adjustment process 10 may compare 250 at least one performance benchmark to at least one performance indicator for front end LUN 230. Examples of such performance benchmarks may include but are not limited to IOs per second, response time, latency, utilization, and throughput, wherein such performance benchmarks may be a range. Further, the acceptable range of such performance benchmarks may vary greatly depending upon several factors, examples of which may include but are not limited to the type of backend device (e.g., flash, SATA, fiber channel) and the performance requirements of the front end LUN.

The term benchmark, as utilized above, is intended to imply a certain Quality of Service (QOS). For a specific usage of storage (e.g. transaction processing application, data warehouse, file server, etc.), a QOS may be specified that could be translated into a benchmark consisting of e.g., IOPs, latency, bandwidth where the storage system will attempt to meet the benchmark with the lowest fault domain possible. Should the benchmark change (e.g., by customer request) or the usage of the storage change (e.g., workload change to the storage system), the storage system may adapt by modifying the fault domain by relocating slices as appropriate in an attempt to meet the benchmark.

Assume for illustrative purposes that for any of the above-referenced performance benchmarks, there is an acceptable range, wherein the performance is considered unacceptably poor below the acceptable range and unnecessarily high above the acceptable range.

Assume for this example that LUN adjustment process 10 is utilizing the performance benchmark of IOs per second to gauge the performance of front end LUN 230. Accordingly, LUN adjustment process 10 may compare 250 the IOs per second performance benchmark to the measured IOs per second performance indicator for front end LUN 230. Assume that the acceptable IOs per second range is 1,000 to 2,000 IOs per second.

If the measured IOs per second performance indicator exceeds the IOs per second performance benchmark (e.g., 1,000 to 2,000 IOs per second), LUN adjustment process 10 may reduce 252 the failure domain of front end LUN 230. As discussed above, reducing 252 the failure domain of front end LUN 230 may decrease the performance of front end LUN 230 by decreasing the quantity of backend devices contributing slices to front end LUN 230.

Assume for illustrative purposes that the measured IOs per second performance indicator for front end LUN 230 is 3,200 IOs per second and, therefore, the measured IOs per second performance indicator exceeds the IOs per second performance benchmark of 1,000 to 2,000 IOs per second. Accordingly, LUN adjustment process 10 may reduce 252 the failure domain of front end LUN 230 by decreasing the quantity of backend devices contributing slices to front end LUN 230. Therefore, LUN adjustment process 10 may reconfigure front end LUN 230 so that instead of getting the five slices that make up front end LUN 230 from four backend device, the number of backend devices may be reduced to three. For example, LUN adjustment process 10 may reconfigure front end LUN 230 so that backend device 210 (via backend LUN 200) provides two slices to front end LUN 230 and backend device 212 (via backend LUN 202 no longer provides any slices to front end LUN 230. Thus, the failure domain of front end LUN 230 has decreased from four to three devices and the performance of front end LUN will decrease accordingly.

If the measured IOs per second performance indicator does not exceed the IOs per second performance benchmark (e.g., 1,000 to 2,000 IOs per second), LUN adjustment process 10 may increase 254 the failure domain of front end LUN 230. As discussed above, increasing 254 the failure domain of front end LUN 230 may increase 254 the performance of front end LUN 230 by increasing the quantity of backend devices contributing slices to front end LUN 230.

Assume for illustrative purposes that the measured IOs per second performance indicator for front end LUN 230 is 1,200 IOs per second and, therefore, the measured IOs per second performance indicator does not exceed the IOs per second performance benchmark of 1,000 to 2,000 IOs per second. Accordingly, LUN adjustment process 10 may increase 254 the failure domain of front end LUN 230 by increasing the quantity of backend devices contributing slices to front end LUN 230. Therefore, LUN adjustment process 10 may reconfigure front end LUN 230 so that instead of getting the five slices that make up front end LUN 230 from four backend device, the number of backend devices may be increased to five. For example, LUN adjustment process 10 may reconfigure front end LUN 230 so that backend device 218 (via backend LUN 208) no longer provides two slice to front end LUN 230 and backend device 216 (via backend LUN 206 now provides a slice to front end LUN 230. Thus, the failure domain of front end LUN 230 has increased from four to five devices and the performance of front end LUN will increased accordingly.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   identifying a specific usage for a storage system;
   specifying a quality of service ("QOS") for the storage system;

translating the quality of service into at least one performance benchmark;

comparing the at least one performance benchmark to at least one performance indicator for a front end LUN, wherein the front end LUN is constructed from a plurality of slices from a plurality of backend LUNs, wherein the at least one performance benchmark is a numerical range that varies based upon, at least in part, at least one of a type of backend device contributing slices to the front end LUN and performance requirements of the front end LUN;

if the at least one performance indicator exceeds the at least one performance benchmark, reducing the failure domain of the front end LUN; and if the at least one performance indicator does not exceed the performance benchmark, increasing the failure domain of the front end LUN.

2. The computer-implemented method of claim 1 wherein reducing the failure domain decreases the performance of the front end LUN by decreasing the quantity of a plurality of backend devices contributing slices to the front end LUN.

3. The computer-implemented method of claim 1 wherein increasing the failure domain increases the performance of the front end LUN by increasing the quantity of a plurality of backend devices contributing slices to the front end LUN.

4. The computer-implemented method of claim 1 wherein the plurality of backend LUNs are generated from a plurality of backend devices included within a data array.

5. The computer-implemented method of claim 1 wherein the performance benchmark is chosen from the group consisting of: IOs per second, response time, latency, utilization, and throughput.

6. A computer program product residing on a non-transitory computer readable medium having a plurality of instructions stored thereon which, when executed by a processor, cause the processor to perform operations comprising:

identifying a specific usage for a storage system;

specifying a quality of service ("QOS") for the storage system;

translating the quality of service into at least one performance benchmark;

comparing the at least one performance benchmark to at least one performance indicator for a front end LUN, wherein the front end LUN is constructed from a plurality of slices from a plurality of backend LUNs, wherein the at least one performance benchmark is a numerical range that varies based upon, at least in part, at least one of a type of backend device contributing slices to the front end LUN and performance requirements of the front end LUN;

if the at least one performance indicator exceeds the at least one performance benchmark, reducing the failure domain of the front end LUN; and if the at least one performance indicator does not exceed the performance benchmark, increasing the failure domain of the front end LUN.

7. The computer program product of claim 6 wherein reducing the failure domain decreases the performance of the front end LUN by decreasing the quantity of a plurality of backend devices contributing slices to the front end LUN.

8. The computer program product of claim 6 wherein increasing the failure domain increases the performance of the front end LUN by increasing the quantity of a plurality of backend devices contributing slices to the front end LUN.

9. The computer program product of claim 6 wherein the plurality of backend LUNs are generated from a plurality of backend devices included within a data array.

10. The computer program product of claim 6 wherein the performance benchmark is chosen from the group consisting of: IOs per second, response time, latency, utilization, and throughput.

11. A computing system including at least one processor and at least one memory architecture coupled with the at least one processor, wherein the computing system is configured to perform operations comprising:

identifying a specific usage for a storage system;

specifying a quality of service ("QOS") for the storage system;

translating the quality of service into at least one performance benchmark;

comparing the at least one performance benchmark to at least one performance indicator for a front end LUN, wherein the front end LUN is constructed from a plurality of slices from a plurality of backend LUNs, wherein the at least one performance benchmark is a numerical range that varies based upon, at least in part, at least one of a type of backend device contributing slices to the front end LUN and performance requirements of the front end LUN;

if the at least one performance indicator exceeds the at least one performance benchmark, reducing the failure domain of the front end LUN; and if the at least one performance indicator does not exceed the performance benchmark, increasing the failure domain of the front end LUN.

12. The computing system of claim 11 wherein reducing the failure domain decreases the performance of the front end LUN by decreasing the quantity of a plurality of backend devices contributing slices to the front end LUN.

13. The computing system of claim 11 wherein increasing the failure domain increases the performance of the front end LUN by increasing the quantity of a plurality of backend devices contributing slices to the front end LUN.

14. The computing system of claim 11 wherein the plurality of backend LUNs are generated from a plurality of backend devices included within a data array.

15. The computing system of claim 11 wherein the performance benchmark is chosen from the group consisting of: IOs per second, response time, latency, utilization, and throughput.

* * * * *